United States Patent
Ramos et al.

(10) Patent No.: US 7,434,123 B2
(45) Date of Patent: Oct. 7, 2008

(54) SINGLE EVENT FUNCTIONAL INTERRUPT DETECTION SYSTEM

(75) Inventors: Jeremy Ramos, Clearwater, FL (US); Christopher J. Butera, Odessa, FL (US)

(73) Assignee: Honeywell International Inc., Morristown, NJ (US)

( * ) Notice: Subject to any disclaimer, the term of this patent is extended or adjusted under 35 U.S.C. 154(b) by 337 days.

(21) Appl. No.: 11/211,966

(22) Filed: Aug. 25, 2005

(65) Prior Publication Data
US 2007/0050691 A1 Mar. 1, 2007

(51) Int. Cl.
*G01R 31/28* (2006.01)

(52) U.S. Cl. ....................................... 714/724

(58) Field of Classification Search .................. 714/724, 714/725
See application file for complete search history.

(56) References Cited

U.S. PATENT DOCUMENTS 6,098,179 A * 8/2000 Harter, Jr. .................... 714/4
6,654,909 B1 * 11/2003 Quach et al. ................. 714/30
6,697,973 B1 * 2/2004 Baumeister et al. .......... 714/55
2003/0172328 A1 * 9/2003 Wyatt et al. ................. 714/704
2006/0117234 A1 * 6/2006 Miyake et al. .............. 714/725
2007/0050689 A1 * 3/2007 Sasakura .................... 714/718

OTHER PUBLICATIONS

Carmichael, C. et al., Seu Mitigation Techniques for Virtex FPGAs in Space Applications, www.xilinx.com/appnotes/vtxSEU.pdf, Sep. 1999, pp. 11 pgs,. Publisher: XILINX.

* cited by examiner

*Primary Examiner*—James C Kerveros
(74) *Attorney, Agent, or Firm*—Fogg & Powers LLC

(57) ABSTRACT

A method for detecting a single event functional interrupt for an electronic circuit is provided. The method involves periodically generating a refresh signal for the electronic circuit, and generating a single event functional interrupt indicator signal in the electronic circuit that is responsive to the refresh signal. The method also involves monitoring the single event functional interrupt indicator signal for a state that indicates a failed refresh attempt.

22 Claims, 5 Drawing Sheets

SINGLE EVENT FUNCTIONAL INTERRUPT DETECTION SYSTEM

TECHNICAL FIELD

The present invention relates to the detection of adverse events in electronic circuits, and in particular, adverse events that cause a loss of communication with the configuration memory of an electronic circuit.

BACKGROUND

There exist today numerous methods for monitoring the occurrence of Single Event Functional Interrupts (SEFIs) in an electronic circuit and, in particular, field programmable gate arrays (FPGAs). Since the electrical interface to an FPGA is susceptible to an SEFI, which can manifest itself as a loss of communication with the configuration memory, a periodic read back of at least one frame inside the FPGA, along with a cyclical redundancy check (CRC) calculation and comparison is performed to determine if the same configuration error persists through multiple refreshes of the configuration memory. When performing this evaluation, an assumption is made that if the same error exists through multiple refreshes of the configuration memory, the refresh is not reaching the memory and a SEFI has occurred.

Including the ability to periodically read back frames and adding CRC functionality adds complexity to the design of the configuration manager used for the electronic circuit, and an inherent delay exists in registering a SEFI since multiple refresh cycles are required as part of the evaluation process. A typical delay extends the recovery time from an event of this nature past one refresh cycle. The longer the SEFI is allowed to manifest itself, the more likely data will be corrupted within the electronic circuit.

When a SEFI detection system cannot notify the configuration manager in an electronic circuit of a SEFI within a minimal recovery time, electronic circuits are continuously operating with greater amounts of communication interference. Without a reliable and efficient SEFI detection system available, the applications for an electronic circuit of this type are limited, especially in operating environments susceptible to high amounts of radiation.

For the reasons stated above and for other reasons stated below which will become apparent to those skilled in the art upon reading and understanding the specification, there exists a need in the art for improved detection of adverse events in electronic circuits.

SUMMARY

Embodiments of the present invention address problems with detection of adverse events in electronic circuits and will be understood by reading and studying the following specification. Particularly, in one embodiment, a method for detecting a single event functional interrupt for an electronic circuit is provided. The method involves periodically generating a refresh signal for the electronic circuit, and generating a single event functional interrupt indicator signal in the electronic circuit that is responsive to the refresh signal. The method also involves monitoring the single event functional interrupt indicator signal for a state that indicates a failed refresh attempt.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with detection of adverse events in electronic circuits and will be understood by reading and studying the following specification. Particularly, in one embodiment, a method for detecting a single event functional interrupt for an electronic circuit is provided. The method involves periodically generating a refresh signal for the electronic circuit, and generating a single event functional interrupt indicator signal in the electronic circuit that is responsive to the refresh signal. The method also involves monitoring the single event functional interrupt indicator signal for a state that indicates a failed refresh attempt.

Embodiments of the present invention may be implemented with present electronic circuit and computing technologies employing reconfigurable devices. This description is presented with enough detail to provide an understanding of the present invention, and should not be construed to encompass all necessary elements in a detection system of adverse events for electronic circuits.

Although the examples of embodiments in this specification are described in terms of detection of SEFI errors in an FPGA, embodiments of the present invention are not limited to applications of detection of SEFI errors in an FPGA. Embodiments of the present invention are applicable to any error detection activity that requires notifying the configuration circuit in a reconfigurable electronic device that a communication error has occurred within a minimum amount of operating cycles. Alternate embodiments of the present invention to those described below utilize a detection system for an electronic circuit that can notify the configuration manager of a SEFI within one refresh cycle.

Figure 1:
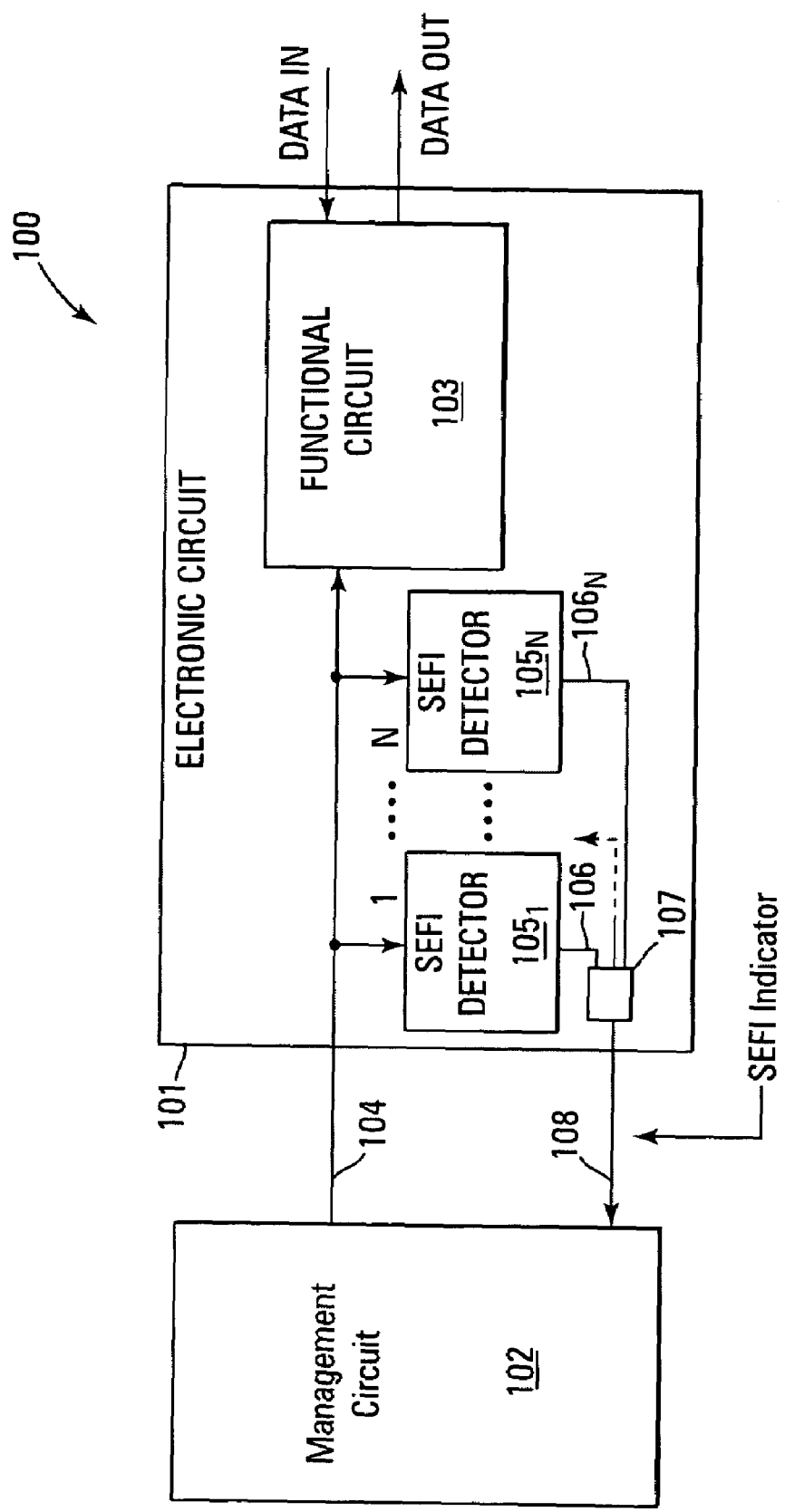
FIG. 1 is a block diagram of an embodiment of an electronic system with a single event functional interrupt (SEFI) detection system.

Referring to the drawings, FIG. 1 is a block diagram of an embodiment of an electronic system, indicated generally at 100, with a single event functional interrupt (SEFI) detection system according to the teachings of the present invention. System 100 has a management circuit 102, e.g., a configuration manager for a field programmable gate array (FPGA), coupled to electronic circuit 101. Electronic circuit 101 includes a functional circuit 103. Electronic circuit 101 is coupled to management circuit 102 by configuration interface 104. In one embodiment, electronic circuit 101 is any programmable logic device, e.g., an FPGA, with a configuration port, the ability to instantiate registers within the device logic, and a mechanism to provide an output to management circuit 102. Management circuit 102 manages the configuration validity of functional circuit 103.

Electronic circuit 101 includes circuitry that is designed to detect single event functional interrupts. Advantageously, this circuitry detects a SEFI within a single refresh period of circuit 101. Circuit 101 includes a plurality of SEFI detector circuits $105_1$ to $105_N$. SEFI detector circuits $105_1$ to $105_N$ are coupled to configuration interface 104 to receive a refresh signal from management circuit 102. In one embodiment, the refresh operation is designed to completely overwrite the electronic circuit 101 including SEFI detector circuits $105_1$ to $105_N$ and functional circuit 103. At least two of the SEFI detector circuits $105_1$ to $105_N$ are provided to avoid failure of detecting a SEFI due to a failure in one of the SEFI detector circuits $105_1$ to $105_N$.

Each of SEFI detector circuits $105_1$ to $105_N$ generates one of SEFI indicator signals $106_1$ to $106_N$ in response to the refresh signal provided by configuration interface 104. In one embodiment, SEFI detector circuits $105_1$ to $105_N$ operate on data that is refreshed through the refresh signal on configuration interface 104. Operations performed by SEFI detector circuit $105_1$ to $105_N$ are implemented such that outputs $106_1$ to $106_N$ are indicative of whether the refresh operation was successful. If the refresh operation is not successful, then a SEFI has occurred. Thus, the values of outputs $106_1$ to $106_N$ indicate whether a SEFI has occurred.

The SEFI indicator signals $106_1$ to $106_N$ are processed by majority voter 107 so that the SEFI indicator is only triggered if a majority of SEFI detector circuits $105_1$ to $105_N$ indicate a SEFI has occurred. The SEFI indicator signal is provided on line 108 to the management circuit 102 providing multiple redundancy to eliminate the possibility of erroneous SEFI indications.

In operation, electronic circuit 101 alerts management circuit 102 of the occurrence of a SEFI through a SEFI indicator signal on line 108. Management circuit 102 periodically refreshes electronic circuit 101. SEFI detectors $105_1$ to $105_N$ respond to the refresh signal on configuration interface 104. If the refresh signal is effective, at least a majority of the SEFI detectors $105_1$ to $105_N$ output a signal $106_1$ to $106_N$ that indicates that the electronic circuit 101 is operating normally because it was properly refreshed. These signals $106_1$ to $106_N$ are processed by majority voter 107 and place the SEFI indicator signal on line 108 in a state that indicates a normal operation mode to management circuit 102. If the refresh signal is not effective, this causes at least a majority of the SEFI detectors $105_1$ to $105_N$ to operate in a way that produces an output that indicates that a SEFI has occurred. The outputs $106_1$ to $106_N$ of SEFI detectors $105_1$ to $105_N$ are processed by majority voter 107 to produce a SEFI indicator signal on line 108 with a state that indicates that a SEFI has occurred in electronic circuit 101.

Figure 2:
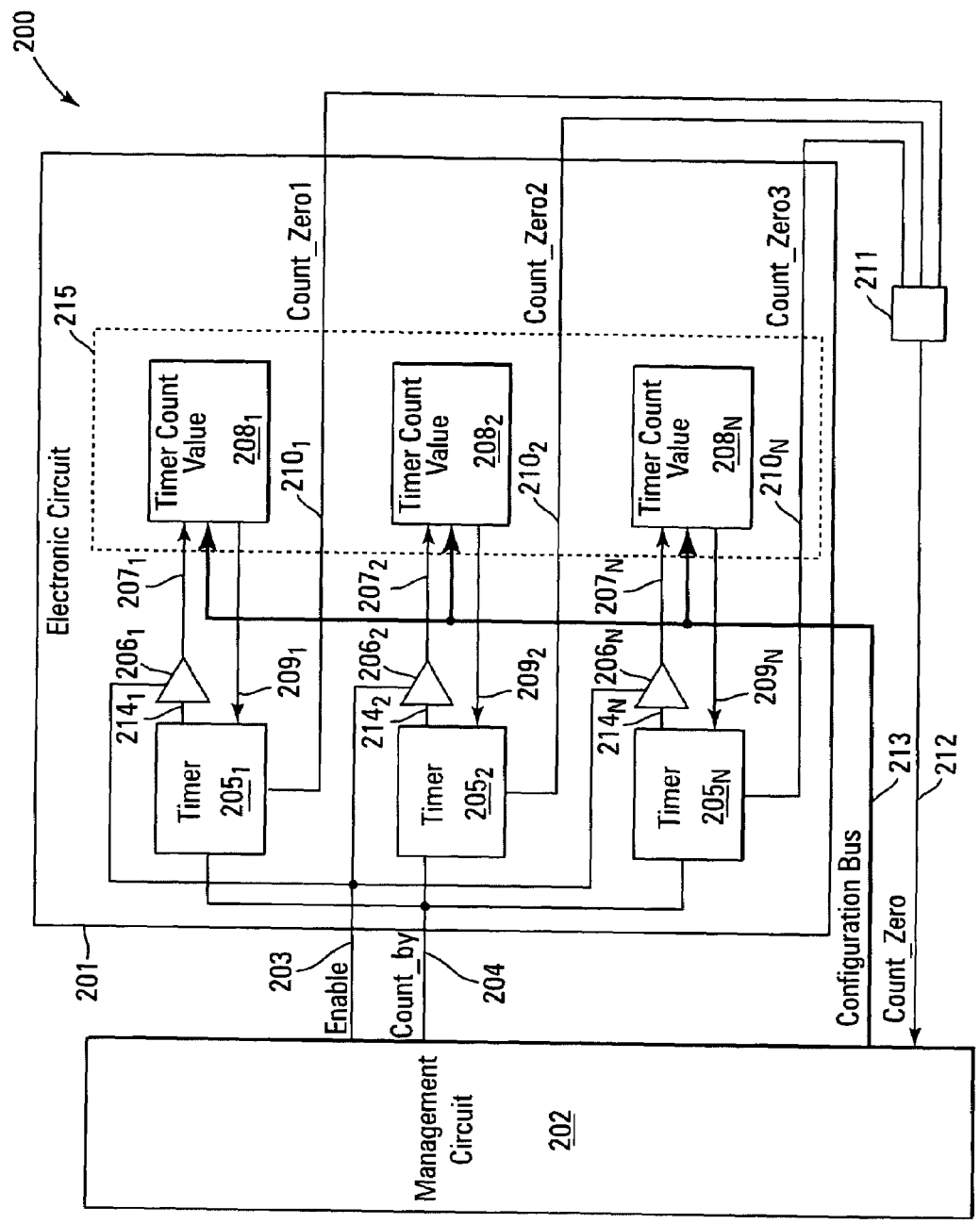
FIG. 2 is a block diagram of an embodiment of a SEFI detection system with a SEFI detection circuit.

FIG. 2 is a block diagram of an embodiment of a SEFI detection system, indicated generally at 200, with a SEFI detection circuit according to the teachings of the present invention. System 200 has a management circuit 202 coupled to electronic circuit 201, e.g., an FPGA. The embodiment of electronic circuit 201 shown in FIG. 2 includes a plurality of timer circuits $205_1$ to $205_N$ coupled to a plurality of tri-state buffers $206_1$ to $206_N$, respectively, by a plurality of buffer lines $214_1$ to $214_N$. In one embodiment, timer circuits $205_1$ to $205_N$ and tri-state buffers $206_1$ to $206_N$ are logic elements available within an FPGA. Tri-state buffers $206_1$ to $206_N$ are coupled directly to a plurality of memory storage registers $208_1$ to $208_N$, respectively, within memory map 215, e.g. storage registers within the block random access memory (Block RAM) of an FPGA, by a plurality of buffer output lines $207_1$ to $207_N$. In one embodiment, memory storage registers $208_1$ to $208_N$ are coupled to timer circuits $205_1$ to $205_N$, respectively, to read the timer count values stored in each of memory storage registers $208_1$ to $208_N$. Each of the timer circuits $205_1$ to $205_N$ generate one of SEFI indicator flags $210_1$ to $210_N$, respectively, in response to the timer count value read from memory storage registers $208_1$ to $208_N$. SEFI indicator lines $210_1$ to $210_N$ are processed by majority voter 211. The output of majority voter 211 is coupled to provide a SEFI indicator signal to management circuit 202 by line 212. The SEFI indicator signal on line 212 indicates a SEFI has occurred when a majority of the timer circuits $205_1$ to $205_N$ detect a SEFI.

Electronic circuit 201 is coupled to management circuit 202 by write enable line 203 and timer count value adjustment line 204. In one embodiment, write enable line 203 is coupled to each of tri-state buffers $206_1$ to $206_N$, and timer count value adjustment line 204 is coupled to each of timer circuits $205_1$ to $205_N$. The write enable signal provided by write enable line 203 is used to prevent any interruption in operation when timer circuits $205_1$ to $205_N$ are instructed to decrement the count values stored in memory storage registers $208_1$ to $208_N$, respectively, to the next time interval indicated by timer count value adjustment line 204.

Electronic circuit 201 is also coupled to management circuit 202 by configuration bus line 213. In one embodiment, the configuration bus line 213 is coupled to each of memory storage registers $208_1$ to $208_N$. Each of memory storage registers $208_1$ to $208_N$ are re-instantiated with an initial timer count value when instructed to by configuration bus line 213.

In operation, electronic circuit 201 alerts management circuit 202 of the occurrence of a SEFI through a SEFI indicator signal on line 212. Management circuit 202 is configured to provide a count-by value through timer count value adjustment line 204 to each of timer circuits $205_1$ to $205_N$. Timer circuits $205_1$ to $205_N$ decrement the value in their associated memory storage registers $208_1$ to $208_N$ based on the count-by value. The initial value and count-by value are chosen to assure that the value in the registers $208_1$ to $208_N$ stay above a threshold, e.g., zero, for the duration of a refresh cycle of electronic circuit 201. If the value in registers $208_1$ to $208_N$ falls below the threshold, then registers $208_1$ to $208_N$ were not properly refreshed, indicating that a SEFI has occurred.

During normal operation, timer circuits $205_1$ to $205_N$ read the current timer count value stored in their associated memory storage registers $208_1$ to $208_N$. Timer circuits $205_1$ to $205_N$ decrement this value by the count-by value provided by timer count value adjustment line 204. Timer circuits $205_1$ to $205_N$ write the adjusted timer count value back to their respective memory storage registers $208_1$ to $208_N$. Concurrently, management circuit 202 periodically refreshes electronic circuit 201 by providing a refresh signal on write enable line 203. If a refresh signal is received by any of tri-state buffers $206_1$ to $206_N$, any of memory storage registers $208_1$ to $208_N$ are instructed by configuration bus line 213 to re-instantiate themselves with the initial count value and restart the timer circuits $205_1$ to $205_N$. If configuration bus line 213 is unable to re-instantiate any of memory storage registers $208_1$ to $208_N$, the corresponding timer circuit $205_1$ to $205_N$ counts down to below a threshold, e.g. zero. If the timer count value read by any of timer circuits $205_1$ to $205_N$ is at or below a threshold, e.g., zero, at least a majority of SEFI indicator flags $210_1$ to $210_N$ are set by their respective timer circuits $205_1$ to $205_N$. Majority voter 211 produces a SEFI indicator signal on line 212 to notify management circuit 202 that a SEFI has been detected by electronic circuit 201.

Figure 3:
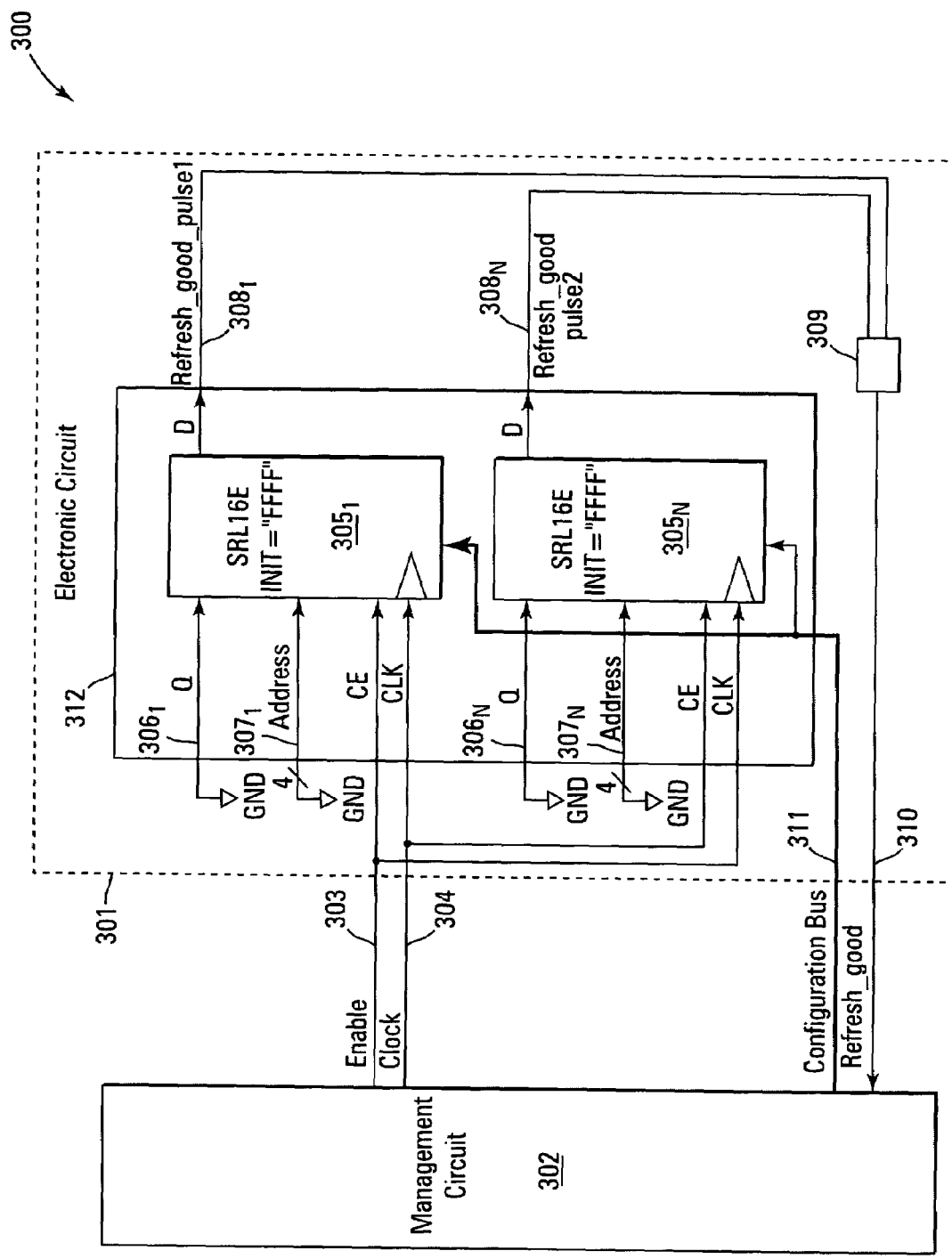
FIG. 3 is a block diagram of another embodiment of a SEFI detection system with a SEFI detection circuit.

FIG. 3 is a block diagram of an embodiment of a SEFI detection system, indicated generally at 300, with a SEFI detection circuit according to the teachings of the present invention. System 300 has a management circuit 302 coupled to electronic circuit 301, e.g. an FPGA. The embodiment of electronic circuit 301 shown in FIG. 3 includes a plurality of shift registers $305_1$ to $305_N$ coupled to a plurality of input lines $306_1$ to $306_N$, respectively, and a plurality of address lines $307_1$ to $307_N$, respectively. In one embodiment, shift registers $305_1$ to $305_N$, are contained within memory map 312, e.g. 16-bit shift registers within the look up table read only memory (LUTRAM) of an FPGA. Input lines $306_1$ to $306_N$ and address lines $307_1$ to $307_N$ are coupled directly to ground within electronic circuit 301. Each of the shift registers $305_1$ to $305_N$ generate one of outputs $308_1$ to $308_N$, respectively, in response to each of the shift registers $305_1$ to $305_N$ enabled by clock enable line 303 and clock signal line 304. Outputs $308_1$ to $308_N$ are processed by majority voter 309. The output of majority voter 309 is coupled to provide a SEFI indicator signal to management circuit 302 by line 310.

Electronic circuit 301 is coupled to management circuit 302 by clock enable line 303 and clock signal line 304. In one embodiment, clock enable line 303 and clock signal line 304 are coupled to each of shift registers $305_1$ to $305_N$. The clock enable and clock signals provided by clock enable line 303 and clock signal line 304, respectively, are used to enable each of shift registers $305_1$ to $305_N$ after a refresh cycle has occurred.

Electronic circuit 301 is also coupled to management circuit 302 by configuration bus line 311. In one embodiment, the configuration bus line 311 is coupled to each of shift registers $305_1$ to $305_N$. The value provided by management circuit 302 via configuration bus line 311 initializes the detection value stored in each of shift registers $305_1$ to $305_N$.

In operation, electronic circuit 301 alerts management circuit 302 of the occurrence of a SEFI through a SEFI indicator signal on line 310. Management circuit 302 is configured to provide an initial value, e.g., all logical ones, on configuration bus line 311 to each of shift registers $305_1$ to $305_N$ during every refresh cycle of electronic circuit 301. Once the refresh cycle is complete, each shift register $305_1$ to $305_N$ is enabled. Since the input of each shift register $305_1$ to $305_N$ is grounded, logical zeroes are shifted in the registers $305_1$ to $305_N$ once the registers are filled with all logical ones. As the logical zeroes are shifted in, the logical ones are shifted out of each of shift registers $305_1$ to $305_N$ to outputs $308_1$ to $308_N$, respectively. Thus, each of outputs $308_1$ to $308_N$ will send a pulse, e.g., all logical ones preceded and followed by all logical zeroes, to majority voter 309. This is referred to as a detection pulse. If this detection pulse is not provided by line 310 to management circuit 302 after a refresh cycle, management circuit 302 is aware that a SEFI has been detected by electronic circuit 301. The SEFI is indicated because the lack of a pulse of logical ones (the detection pulse) means that the electronic device was not reset properly.

Figure 4:
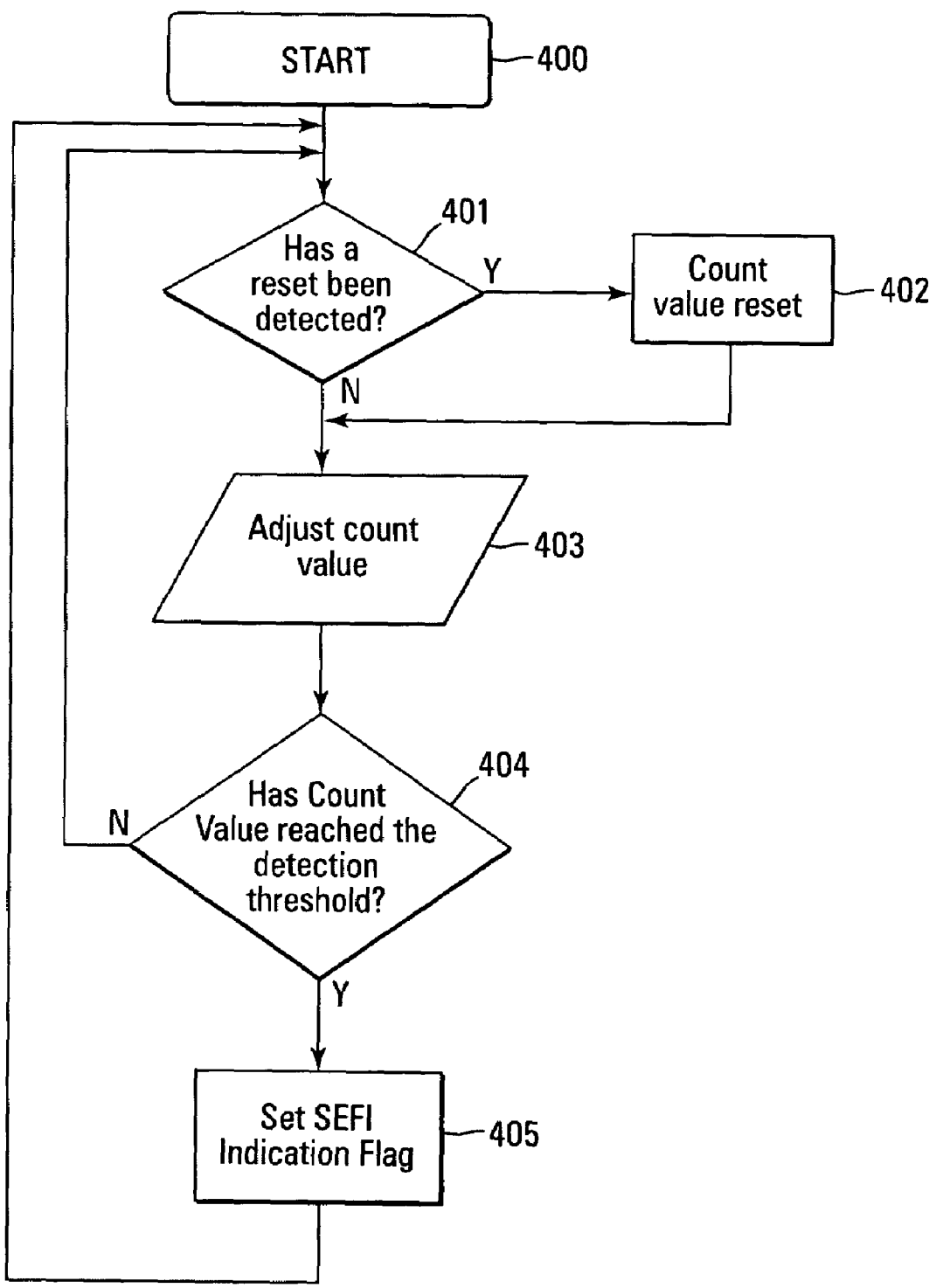
FIG. 4 is a flow diagram illustrating an embodiment of a method for providing SEFI detection to an electronic circuit, based on the periodic refresh of the electronic circuit.

FIG. 4 is a flow diagram illustrating an embodiment of a method according to the teachings of the present invention for providing SEFI detection to an electronic circuit. The method of FIG. 4 begins at block 400. Once an electronic circuit is enabled, it may become susceptible to one or more SEFIs. The method of FIG. 4 is designed to detect a SEFI using the functionality of a function that is based on the periodic refresh of the electronic circuit.

At block 401, the method determines whether a reset is detected. If so, the method resets the timer count value at block 402, and the method proceeds to block 403. If a reset is not detected, the method proceeds to block 403.

At block 403, the process adjusts the timer count value by a specified adjustment amount. In one embodiment, the initial count value and the adjustment amount are set such that a SEFI is detectable in a single refresh period of the electronic circuit because the count value decreases below a threshold only when the count value is not reset during a single reset period at block 402.

At block 404, the process determines if the timer count value has reached a detection threshold value. If the timer count value has reached the detection threshold value, e.g. zero, a SEFI detection flag is set in block 405 before the cycle begins again at block 401. If, however, the detection threshold value has not been reached, the cycle begins again at 401.

Figure 5:
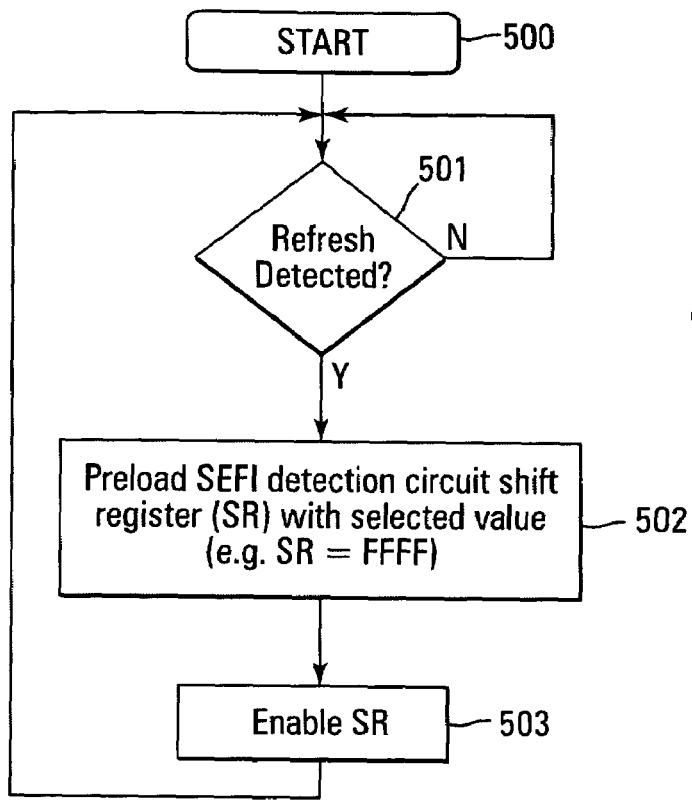
FIG. 5 is a flow diagram illustrating an embodiment of a method for providing SEFI detection to an electronic circuit, based on the use of at least one shift register within the electronic circuit.

FIG. 5 is a flow diagram illustrating an embodiment of a method according to the teachings of the present invention for providing SEFI detection to an electronic circuit. The method of FIG. 5 begins at block 500. Once an electronic circuit is enabled, it may become susceptible to one or more SEFIs. The method of FIG. 5 is designed to detect a SEFI using the functionality of a function that is based on the use of at least one shift register within the electronic circuit.

At block 501, the method determines whether a reset is detected. If so, the method preloads at least one shift register with a selected value at block 502, and the method proceeds to block 503. If a reset is not detected, the cycle begins again at block 501.

At block 503, the process enables at least one shift register before the cycle begins again at 501. In one embodiment, this enablement shifts the preloaded value out. The existence of the preloaded value, in one embodiment, is manifest by a pulse in the output signal. If a pulse does not appear when expected, then a SEFI has been detected. Existence of the pulse indicates no SEFI has occurred.

Figure 6:
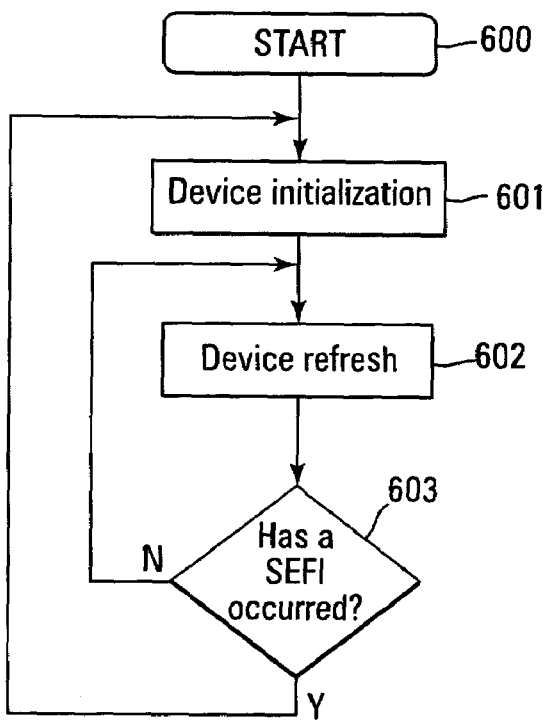
FIG. 6 is a flow diagram illustrating an embodiment of a method for providing SEFI detection to an electronic circuit, based on the use of a FPGA configuration manager connected to the electronic circuit.

FIG. 6 is a flow diagram illustrating an embodiment of a method according to the teachings of the present invention for providing SEFI detection to an electronic circuit. The method of FIG. 6 begins at block 600. Once an electronic circuit is enabled, it may become susceptible to one or more SEFIs. The method of FIG. 6 is designed to detect a SEFI using the functionality of a function that is based on the use of an FPGA configuration manager connected to the electronic circuit.

At block 601, the electronic circuit is initialized by the configuration manager, and the method proceeds to block 602. At block 602, the electronic circuit is refreshed by the configuration manager, and the method proceeds to block 603.

At block 603, the method determines whether a SEFI is detected. If a SEFI is detected, the electronic circuit is re-initialized at block 601 before the cycle begins again at block 602. If a SEFI is not detected, the refresh cycle begins again at block 602.

What is claimed is:

1. A method for detecting a single event functional interrupt for an electronic circuit, the method comprising:
   periodically generating a refresh signal for the electronic circuit;

generating a single event functional interrupt indicator signal in the electronic circuit, the single event functional interrupt indicator signal responsive to effects of the refresh signal on the electronic circuit; and monitoring the single event functional interrupt indicator signal for a state that indicates a failed refresh attempt based on a single event functional interrupt detection threshold.

2. The method of claim 1, wherein periodically generating the refresh signal comprises passing the periodic refresh signal to the electronic circuit from a configuration manager.

3. The method of claim 1, wherein generating the single event functional interrupt indicator signal comprises:
   initializing a timer count value on receipt of the refresh signal;
   counting down between refresh signals; and
   passing the count value as the single event functional interrupt indicator signal.

4. The method of claim 3, wherein counting down between the refresh signals comprises decrementing a counter, the counter maintained above a specified value unless the refresh signal fails due to a single event functional interrupt.

5. The method of claim 1, wherein generating the single event functional interrupt indicator signal comprises:
   loading a shift register with a selected value;
   enabling the electronic circuit to shift in a second selected value to the shift register; and
   passing the output value of the shift register as the single event functional interrupt indicator signal.

6. The method of claim 1, wherein monitoring the single event functional interrupt indicator signal for the state that indicates the failed refresh attempt comprises enabling a periodic refresh sequence to occur within the electronic circuit.

7. A circuit for detecting a single event functional interrupt, the circuit comprising:
   means for receiving a reset signal;
   means for generating, responsive to the means for receiving, a logic signal to use in determining whether a refresh event has occurred; and
   means for indicating, responsive to the means for generating, to a configuration controller the results of the last refresh event.

8. The circuit of claim 7, wherein the means for receiving the reset signal includes the enable line of a programmable logic device.

9. The circuit of claim 7, wherein the means for generating the logic signal to use in determining whether a refresh event has occurred includes a look up table read only memory in a programmable logic device.

10. The circuit of claim 9, wherein the means for generating the logic signal to use in determining whether a refresh event has occurred includes the use of at least one shift register in a programmable logic device.

11. The circuit of claim 7, wherein the means for generating the logic signal to use in determining whether a refresh event has occurred includes the use of at least one timer in a programmable logic device.

12. The circuit of claim 11, wherein the means for generating the logic signal to use in determining whether a refresh event has occurred includes the use of at least one register in a programmable logic device to store a timer count value.

13. The circuit of claim 7, wherein the means for generating the logic signal to use in determining whether a refresh event has occurred includes the use of at least one majority voter.

14. The circuit of claim 7, wherein the means for indicating to the configuration controller the results of the last refresh event includes providing an output signal to the configuration manager of a field programmable gate array.

15. An electronic system, comprising:
   a management circuit that controls the operation of the system;
   a functional circuit responsive to the management circuit; and
   at least one single event functional interrupt detector circuit, resident with the functional circuit, and responsive to a refresh signal from the management circuit, the single event functional interrupt detector circuit adapted to produce a signal in response to effects of the refresh signal on at least the functional circuit to provide the management circuit with information regarding the occurrence of a single event functional interrupt, and wherein the refresh signal is operable to reinitialize the functional circuit and the at least one single event functional interrupt detector circuit.

16. The electronic system of claim 15, wherein the at least one single event functional interrupt circuit comprises two or more single event functional interrupt circuits to avoid failure of the single event functional interrupt detector circuit due to a single event functional interrupt.

17. An apparatus for detecting a single event functional interrupt for an electronic circuit, comprising:
   means for periodically generating a refresh signal for the electronic circuit;
   means for generating a single event functional interrupt indicator signal in the electronic circuit, the single event functional interrupt indicator signal responsive to effects of the refresh signal on the electronic circuit; and
   means for monitoring the single event functional interrupt indicator signal for a state that indicates a failed refresh attempt based on a single event functional interrupt detection threshold.

18. The apparatus of claim 17, wherein means for periodically generating the refresh signal comprises means for passing a periodic refresh signal to the electronic circuit from a configuration manager.

19. The apparatus of claim 17, wherein means for generating the single event functional interrupt indicator signal comprises:
   means for initializing a timer count value on receipt of the refresh signal;
   means for counting down between refresh signals; and
   means for passing the count value as the single event functional interrupt indicator signal.

20. The apparatus of claim 19, wherein means for counting down between the refresh signals comprises means for decrementing a counter, the counter maintained above a specified value unless the refresh signal fails due to a single event functional interrupt.

21. The apparatus of claim 17, wherein means for generating the single event functional interrupt indicator signal comprises:
   means for loading a shift register with a selected value;
   means for enabling the electronic circuit to shift in a second selected value to the shift register; and
   means for passing the output value of the shift register as the single event functional interrupt indicator signal.

22. The apparatus of claim 17, wherein means for monitoring the single event functional interrupt indicator signal for the state that indicates a failed refresh attempt comprises means for enabling a periodic refresh sequence to occur within the electronic circuit.

* * * * *